United States Patent
Fishwick et al.

(10) Patent No.: US 11,551,326 B2
(45) Date of Patent: *Jan. 10, 2023

(54) TILE-BASED GRAPHICS

(71) Applicant: Imagination Technologies Limited, Kings Langley (GB)

(72) Inventors: Steven John Fishwick, Kings Langley (GB); John Howson, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 696 days.

This patent is subject to a terminal disclaimer.

(21) Appl. No.: 15/895,115

(22) Filed: Feb. 13, 2018

(65) Prior Publication Data

US 2018/0174269 A1      Jun. 21, 2018

Related U.S. Application Data

(63) Continuation of application No. 14/218,394, filed on Mar. 18, 2014, now Pat. No. 9,928,563.

(30) Foreign Application Priority Data

Apr. 2, 2013    (GB) ..................... 1305921

(51) Int. Cl.
   *G06T 1/20* (2006.01)
   *G06F 12/0815* (2016.01)
   (Continued)

(52) U.S. Cl.
   CPC ............ *G06T 1/20* (2013.01); *G06F 12/0811* (2013.01); *G06F 12/0815* (2013.01);
   (Continued)

(58) Field of Classification Search
   None
   See application file for complete search history.

(56) References Cited

U.S. PATENT DOCUMENTS 5,566,324 A   10/1996  Kass
5,577,243 A   11/1996  Sherwood et al.
(Continued)

FOREIGN PATENT DOCUMENTS

CN      1610927 A     4/2005
CN    102822871 A    12/2012
(Continued)

OTHER PUBLICATIONS

Antochi "Memory bandwidth requirements of tile-based rendering" Computer Systems: Architectures, Modeling, and Simulation. Springer Berlin Heidelberg, 2004. S. 323-332.
(Continued)

*Primary Examiner* — Robert J Craddock
(74) *Attorney, Agent, or Firm* — Potomac Law Group, PLLC; Vincent M De Luca

(57) ABSTRACT

A tile-based graphics system has a rendering space subdivided into a plurality of tiles which are to be processed. Graphics data items, such as parameters or texels, are fetched into a cache for use in processing one of the tiles. Indicators are determined for the graphics data items, whereby the indicator for a graphics data item indicates the number of tiles with which that graphics data item is associated. The graphics data items are evicted from the cache in accordance with the indicators of the graphics data items. For example, the indicator for a graphics data item may be a count of the number of tiles with which that graphics data item is associated, whereby the graphics data item(s) with the lowest count(s) is (are) evicted from the cache.

20 Claims, 6 Drawing Sheets

(51) Int. Cl.
  *G06F 12/0811* (2016.01)
  *G06T 15/00* (2011.01)
  *G06T 1/60* (2006.01)
  *G06F 12/0875* (2016.01)
  *G06F 12/0891* (2016.01)
  *G06F 12/126* (2016.01)
  *G06F 12/12* (2016.01)

(52) U.S. Cl.
  CPC ...... *G06F 12/0875* (2013.01); *G06F 12/0891* (2013.01); *G06F 12/126* (2013.01); *G06T 1/60* (2013.01); *G06T 15/00* (2013.01); *G06T 15/005* (2013.01); *G06F 12/12* (2013.01); *G06F 2212/1021* (2013.01); *G06F 2212/302* (2013.01); *G06F 2212/45* (2013.01); *G06F 2212/70* (2013.01)

(56) References Cited

U.S. PATENT DOCUMENTS

| | | |
|---|---|---|
| 5,729,672 A | 3/1998 | Ashton |
| 5,867,166 A | 2/1999 | Myhrvold et al. |
| 6,204,856 B1 | 3/2001 | Wood et al. |
| 6,229,553 B1 | 5/2001 | Duluk et al. |
| 6,348,919 B1 | 2/2002 | Murphy |
| 6,380,935 B1 | 4/2002 | Heeschen et al. |
| 6,385,697 B1 | 5/2002 | Miyazaki |
| 6,396,503 B1 | 5/2002 | Goss et al. |
| 6,407,736 B1 | 6/2002 | Regan |
| 6,480,205 B1 | 11/2002 | Green et al. |
| 6,593,929 B2 | 7/2003 | Van Hook et al. |
| 6,636,212 B1 | 10/2003 | Zhu |
| 6,697,063 B1 | 2/2004 | Zhu |
| 6,717,576 B1 | 4/2004 | Duluk, Jr. et al. |
| 6,798,410 B1 | 9/2004 | Redshaw |
| 6,856,320 B1 | 2/2005 | Rubenstein et al. |
| 7,310,100 B2 | 12/2007 | Hussain |
| 7,324,115 B2 | 1/2008 | Fraser |
| 7,405,734 B2 | 7/2008 | Foran |
| 7,626,588 B1 | 12/2009 | Molnar et al. |
| 7,978,199 B2 | 7/2011 | Howson |
| 8,669,987 B2 | 3/2014 | Redshaw et al. |
| 8,686,998 B2 | 4/2014 | Morphet |
| 2003/0122835 A1 | 7/2003 | Doyle et al. |
| 2003/0142871 A1 | 7/2003 | Ishikawa |
| 2007/0146378 A1 | 6/2007 | Sorgard et al. |
| 2009/0066694 A1 | 3/2009 | Redshaw et al. |
| 2010/0122100 A1 | 5/2010 | Strumper |
| 2011/0222936 A1 | 9/2011 | Redshaw |
| 2011/0304608 A1 | 12/2011 | Yang |
| 2013/0076762 A1 | 3/2013 | Heggelund et al. |

FOREIGN PATENT DOCUMENTS

| | | |
|---|---|---|
| WO | 01/95257 A1 | 12/2001 |
| WO | 2013/022804 A1 | 2/2013 |

OTHER PUBLICATIONS

Hsiao et al "A hierarchical primitive lists structure for tile-based rendering" Computational Science and Engineering, CSE'09. International Conference on. IEEE, 2009. S. 408-413.

Hsiao et al "Efficient rendering and cache replacement mechanisms for hierarchical tiling in mobile GPUs" Global High Tech Congress on Electronics (GHTCE), 2012 IEEE, pp. 170-175.

TILE-BASED GRAPHICS

CROSS-REFERENCE TO RELATED APPLICATION(S)

This application claims priority from Great Britain Application No. 1305921.7, filed on Apr. 2, 2013, the contents of which is incorporated in its entirety herein.

BACKGROUND

A tile-based graphics system renders 2D or 3D computer graphics images using tile based rendering. As part of a tile-based rendering technique a rendering space is sub-divided into a plurality of regions called tiles or blocks (herein referred to as "tiles"), which each comprise a plurality of pixels. Tiles are often rectangular, but they may be other shapes such as triangular or hexagonal. The rendering space may correspond to an image for display on a screen, but other render targets, such as texture data in memory, are also possible. Tiles can be various sizes, for example tiles may be 16×16 pixels. In one example of a screen resolution, there are 1280×1024 pixels. At such a resolution, there would 5120 tiles, each comprising 16×16 pixels.

As a matter of terminology, "pixels" are individual image points which are displayed in a final image, whereas "fragments" are individual image points which are processed in order to generate the pixels for display in a final image. Some implementations may provide multiple fragments overlapping one pixel. Primitives are often polygons, typically triangles, but may have other forms such as points, lines or patches.

A display list is derived, for each tile, indicating primitives located either partially or wholly within the tile. Each tile is rendered using its display list. The objects are rasterized to determine which objects are present in each of the fragments of the tile.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A tile-based graphics system has a rendering space sub-divided into a plurality of tiles which are to be processed. Graphics data items, such as parameters or texels, are fetched into a cache for use in processing one of the tiles. Indicators are determined for the graphics data items, whereby the indicator for a graphics data item indicates the number of tiles with which that graphics data item is associated. The graphics data items are evicted from the cache in accordance with the indicators of the graphics data items. For example, the indicator for a graphics data item may be a count of the number of tiles with which that graphics data item is associated, whereby the graphics data item(s) with the lowest count(s) is (are) evicted from the cache.

In particular, there is provided a method of processing data in a tile-based graphics system having a rendering space sub-divided into a plurality of tiles with which graphics data items are associated, the method comprising: fetching, from a graphics data memory into a cache, graphics data items which are to be used in processing one of the tiles; and reading the graphics data items from the cache for use in processing said one of the tiles, wherein the method further comprises: determining indicators for the graphics data items, wherein, for each of the graphics data items, the indicator for that graphics data item is indicative of the number of tiles with which that graphics data item is associated; determining which of the graphics data items in the cache to evict based on the determined indicators; and evicting the determined graphics data items from the cache.

The graphics data items may be stored in graphics data sets in the graphics data memory with each of the graphics data sets comprising one or more of the graphics data items. As an example, a particular graphics data item may be associated with a particular tile if a graphics data item in the graphics data set comprising the particular graphics data item is to be used to process the particular tile, and for each of the graphics data items, the indicator for that graphics data item may be indicative of the number of tiles which are processed using a graphics data item in the graphics data set comprising that graphics data item. As another example, a particular graphics data item may be associated with a particular tile if the particular graphics data item is to be used to process the particular tile, and for each of the graphics data items, the indicator for that graphics data item may be indicative of the number of tiles which are processed using that graphics data item.

The method may further comprise determining bounding regions for the graphics data items wherein a particular graphics data item may be associated with a particular tile if the bounding region for that graphics data item at least partially overlaps the particular tile, and for each of the graphics data items, the indicator for that graphics data item may be indicative of the number of tiles which at least partially overlap the bounding region for that graphics data item. For each of the graphics data items, the bounding region for that graphics data item may contain all of the graphics data items in the graphics data set of that graphics data item.

For each of the graphics data items, the number of tiles with which that graphics data item is associated may be determined during a step of determining which of the graphics data items are present in each of the tiles. Furthermore, the method may further comprise determining an order in which tiles are to be processed based on the indicators of the graphics data items in the cache and based on the step of determining which of the graphics data items are present in each of the tiles.

The graphics data items may be parameters defining geometry for inclusion in the tiles. For example, the graphics data sets may be parameter blocks and the graphics data memory may be a parameter buffer.

The graphics data items may be texels of textures for inclusion in the tiles. For example, the graphics data sets may be textures and the graphics data memory may be a texture memory.

For each of the graphics data items, the indicator may be a count of the number of tiles with which that graphics data item is associated. The method may further comprise decrementing the count for a particular graphics data item when a tile with which the particular graphics data item is associated has been processed. The step of determining which of the graphics data items in the cache to evict may comprise determining which of the graphics data items in the cache has the lowest count. Furthermore, the step of determining which of the graphics data items in the cache to evict may comprise determining whether any of the graphics data items have a count equal to zero. Furthermore, if the count of the particular graphics data item is one when a tile with which the particular graphics data item is associated has been processed then the method may comprise invalidating the cache entry corresponding to the particular graphics data item. The count may be limited, such that for each of the graphics data items, if the number of tiles with which that graphics data item is associated is greater than a predetermined maximum, the count may be determined to be equal to the predetermined maximum. It may be the case that the count is decremented only if the count is less than the predetermined maximum.

In an example, for each of the graphics data items, the indicator for that graphics data item indicates one of two conditions, the two conditions being: (i) that the number of tiles with which that graphics data item is associated is equal to one, and (ii) that the number of tiles with which that graphics data item is associated is greater than one.

In another example, for each of the graphics data items, the indicator for that graphics data item indicates one of four conditions, the four conditions being: (i) that the number of tiles with which that graphics data item is associated is equal to one, (ii) that the number of tiles with which that graphics data item is associated is equal to two, (iii) that the number of tiles with which that graphics data item is associated is equal to three or four, and (iv) that the number of tiles with that graphics data item is associated is greater than four.

The method may further comprise determining that further graphics data items are to be fetched into the cache, and determining that there is insufficient space in the cache to store the further graphics data items without evicting some graphics data items from the cache, wherein said determining which of the graphics data items in the cache to evict and said evicting the determined graphics data items from the cache may be performed responsive to said determining that there is insufficient space in the cache to store the further graphics data items.

If the determined indicators are the same for a plurality of the graphics data items, the step of determining which of the graphics data items in the cache to evict may be further based on respective times that the graphics data items in the cache were last used.

The indicators for the graphics data items may be stored in the cache and may also be stored in the graphics data memory. Alternatively, the indicators for the graphics data items may be stored in the graphics data memory and may be accessed by references stored in the cache referencing the indicators stored in the graphics data memory. In a simple example, a reference could be a pointer to the parameter block. The cache may store a pointer to the parameter block simply as the address (or "tag") of the data (or a trivial function of it).

There is also provided a tile-based graphics system having a rendering space sub-divided into a plurality of tiles with which graphics data items are associated, the tile-based graphics system comprising a processing unit configured to: fetch, from a graphics data memory into a cache, graphics data items which are to be used in processing one of the tiles; read the graphics data items from the cache for use in processing said one of the tiles; determine indicators for the graphics data items, wherein, for each of the graphics data items, the indicator for that graphics data item is indicative of the number of tiles with which that graphics data item is associated; determine which of the graphics data items in the cache to evict based on the determined indicators; and evict the determined graphics data items from the cache.

The above features may be combined as appropriate, as would be apparent to a skilled person, and may be combined with any of the aspects of the examples.

BRIEF DESCRIPTION OF THE DRAWINGS

Examples will now be described in detail by way of reference to the accompanying drawings in which.

Figure 1:
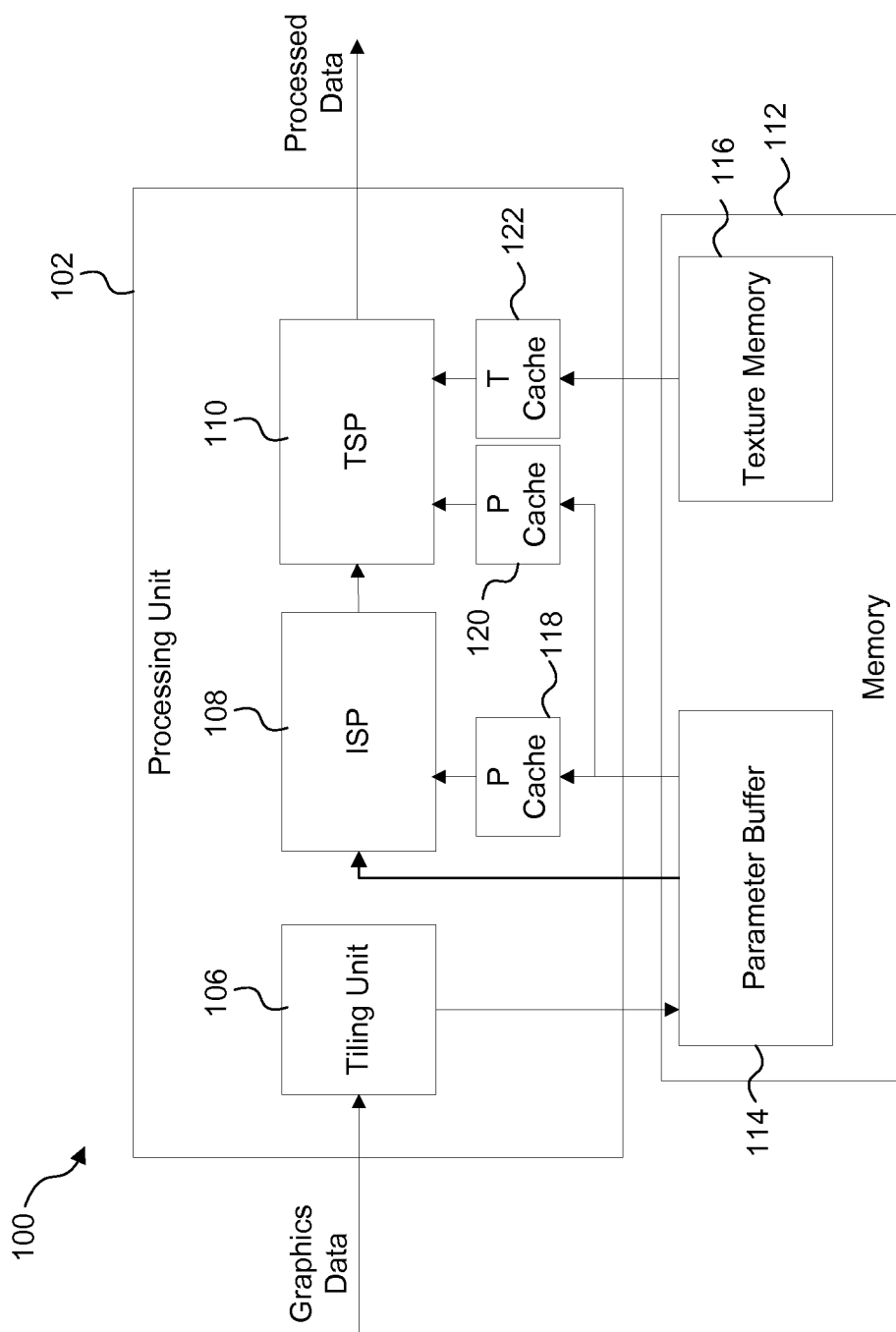
FIG. 1 shows a tile-based graphics system.

Common reference numerals are used throughout the figures to indicate similar features.

DETAILED DESCRIPTION

Tile-based renderers may store primitive data (or "parameters") representing geometrical objects or other geometry in blocks of memory called parameter blocks. Each parameter block contains parameters describing one or more primitives which may be located in multiple tiles. The parameters of the parameter block represent the location of the primitives (e.g. the location of vertices forming the primitives for example in screen space coordinates). The parameters of the parameter block may also indicate other features (or "attributes") of the objects or geometry such as colour and texture.

Parameter blocks for a scene can be stored in a parameter buffer in a memory. The parameters are analysed to determine which of the parameters will be needed to process each of the tiles. In particular, a display list can be derived for each tile, which indicates parameters, if any, describing primitives located either partially or wholly within the tile. In this way, a display list for a tile identifies each of the parameters needed to process the tile. For example, the display list may include references to the relevant parameter data stored in the parameter buffer.

Each tile is rendered using its display list. The objects are rasterized to determine which objects are present in each of the fragments of the tile. During rasterization of the objects in a tile, the parameters indicated in the display list for that tile are fetched from their respective parameter blocks from the parameter buffer into a smaller local memory (which is, for example, on-chip memory) known as a parameter cache. The parameter cache is usually smaller than that required to store the parameters of all of the parameter blocks that are needed in order to render all of the tiles in a scene. Therefore, when a tile has been processed, and new parameters are fetched into the parameter cache for processing a new tile, some of the parameters stored in the parameter cache are evicted from the parameter cache.

In order to determine which of the parameters in the parameter cache are evicted, a Least Recently Used (LRU) eviction policy could be used. According to the LRU eviction policy, the least recently used items (i.e. parameters) are the first to be discarded from the parameter cache Embodiments will now be described by way of example only.

FIG. 1 is a schematic diagram showing a tile-based graphics system 100. The system 100 may be implemented on a device, such as a smart phone, tablet, laptop, Personal Computer (PC), television, or any other appropriate device in which graphics data is to be processed. The tile-based graphics system 100 is configured to receive data, e.g. from an application, process the data and provide an output of processed data. The system 100 comprises a processing unit 102 which is configured to process the data. The processing unit 102 may be implemented in hardware or software, or a combination thereof. For example, some portions of processing unit 102 may be implemented in fixed-function hardware elements comprising circuits configured to process data accordingly as described herein. These fixed-function hardware elements can couple with programmable processing elements.

For example, processing unit 102 may include a physical realization of a Graphics Processing Unit (GPU) that includes some fixed function circuit elements, some programmable elements and some configurable elements, or some combination thereof. The different elements of this physical realization may be be configured, organized and in some cases, reorganized, in order to implement different functional elements of a graphics rendering process. Many different graphics rendering processes can be conceptualized as a pipeline of different constituent operations. These constituent operations can be implemented on different elements in a GPU, on elements that can be simultaneously configured to perform multiple such operations, or on elements that were reconfigured to perform each such operation. Also, processing unit 102 can be modelled as implementing a rendering pipeline according to a particular logical flow, although actual operations being performed by processing unit 102 may differ, in some respects, from the logical flow. Implementations of processing unit 102 may include machine executable code configuring a programmable processor. When machine executable code to perform a specific function is used to configure a programmable processor, that programmable processor effectively both becomes and includes circuitry for performing that specific function (even as it also may simultaneously be and include circuitry for performing other functions).

The processing unit 102 comprises a plurality of functional blocks for processing data, wherein some (but, for clarity, not all) of the functional blocks of the processing unit 102 are shown in FIG. 1. In particular, the processing unit 102 comprises a tiling unit 106, an image synthesis processor (ISP) block 108 and a texture and shading processor (TSP) block 110. Examples of other functional elements of a graphics processing pipeline include aspects of geometry shading, tessellation, clipping, culling, and stencil. The system 100 comprises a memory 112 which is arranged to communicate with the processing unit 102 and blocks therein. The memory 112 comprises a parameter buffer 114 and a texture memory 116. Memory 112 can have different physical manifestations; for example, texture memory 116 may include one or more levels of cache hierarchy, which are physically separate or shared with other kinds of data and memory 112 may support separate physical memories for parameter buffer 114 and for texture memory 116. Memory 112 may have different numbers of physical ports in different implementations. As such, memory 112 represents a range of implementations, the details of which can be determined in accordance with objectives of that implementation, in accordance with the disclosure. The processing unit 102 also comprises a first parameter cache 118, a second parameter cache 120 and a texture cache 122; considerations relating to memory 112 apply also to caches 120 and 122.

An input of the tiling unit 106 is arranged to receive graphics data. An output of the tiling unit 106 is coupled to an input of the parameter buffer 114. A first output of the parameter buffer 114 is coupled to a first input of the ISP block 108. An output of the ISP block 108 is coupled to a first input of the TSP block 110. A second output of the parameter buffer 114 is coupled to an input of the first parameter cache 118 and to an input of the second parameter cache 120. An output of the first parameter cache 118 is coupled to a second input of the ISP block 108. An output of the second parameter cache 120 is coupled to a second input of the TSP block 110. An output of the texture memory 116 is coupled to an input of the texture cache 122. An output of the texture cache 122 is coupled to a third input of the TSP cache 110.

In operation, the processing unit 102 is arranged to receive graphics data, e.g. coming from an application which is currently running on the device on which the system 100 is implemented. The graphics data comprises geometry data that defines objects for display. The tiling unit 106 includes logic for implementing a number of functions in the processing unit 102. In one example, the tiling unit 106 receives the geometry data and derives a plurality of primitives from the geometry data. Some processing to the geometry data may, or may not, be performed by the processing unit 102 (in functional blocks which are not illustrated in FIG. 1) before the tiling unit 106 receives the geometry data. In another example, tiling unit 106 also can receive definitions of primitives defined from received geometry data. The primitives may form surfaces of objects represent geometrical objects or other geometry.

Parameters describing the primitives are stored in the parameter buffer 114 in blocks of memory called parameter blocks. Each parameter block contains parameters describing multiple primitives which may be located in multiple tiles. The primitives are often polygons, such as triangles, but may have other forms, such as lines, points or patches. The parameters of a parameter block represent the location of the primitives (e.g. the location of vertices forming the primitives for example in screen space coordinates). The parameters of the parameter block may also indicate other features of the objects or geometry such as colour and texture.

The tiling unit 106 divides a rendering space into a plurality of tiles, or uses a divided rendering space, each of which may comprise a plurality of fragments. The tiles may be rectangular (including square), but they could be other shapes such as triangular or hexagonal. The rendering space may correspond to an image for display on a screen, but other render targets, such as texture data in memory, are also possible.

For each tile, the tiling unit 106 determines whether each of the primitives is located at least partially within that tile. That is, the tiling unit 106 determines whether at least part of the primitive is located within a viewable region of the tile. This can be done using a number of well-known techniques. As an example, tiling unit 106 can transform 3-D geometry into "screen space" according to a transformation, such transformation can be defined based on a viewpoint. Such transformation can be performed by a programmable element configured accordingly, or by a circuit that can be configured with supplied parameters, for example.

In this way, the tiling unit 106 derives a display list, for each tile, comprising identifiers which identify the parameters (e.g. any of location, colour, and texture of the primitives), if any, which describe primitives which are located either partially or wholly within the tile. That is, the display list for a tile includes a set of references to the parameter blocks which contain geometry at least partially overlapping with the tile. Each of the references may be associated with a mask indicating the subset of parameters from that parameter block that represent primitives that are present in or pertain to primitives in the tile. In such implementations, the display list for a tile identifies each of the parameters needed to process the tile by providing references to relevant parameters stored in the parameter buffer 114. In some cases, the display list may reference position parameters for the primitives, but does not need to reference all parameters available for each primitive (e.g., texture references).

The display lists can be provided from the tiling unit 106 to the parameter buffer 114 for storage therein. ISP block 108 can begin processing a tile by retrieving or otherwise accessing the display list for the tile. Such retrieving or accessing can proceed over time, such as by incrementally processing parts of the display list. When the ISP block 108 processes the tiles, it can, for example, implement Hidden Surface Removal (HSR). In order to implement HSR for a tile, the ISP block 108 processes the parameters indicated in the tile's display list to determine which primitives are visible and which are hidden at each fragment position within the tile. So that the ISP block 108 can process the parameters within a tile, the parameters included in the tile's display list are fetched from the parameter buffer 114 into the parameter cache 118. The ISP block 108 then reads the parameters from the parameter cache 118 for use in processing the tile, e.g. for implementing the HSR. ISP block 108 can remove parameters which will not affect the rendered image before the TSP block 110 processes the tiles, or otherwise indicate which of the primitives are visible at which of the fragments for processing by TSP block 110. ISP block 108 can operate in parallel on multiple fragments of a tile, on multiple tiles, or both.

Some implementations of ISP block 108 also may generate per-fragment parameter data for the parameters of each primitive; for example, per fragment texture references can be produced by ISP block 108.

The TSP block 110 processes the tiles to apply texturing and shading to the objects that are present within the tile. An output from the ISP block 108 is provided to the TSP block 110 which indicates which of the parameters the TSP block 110 will need in order to process the tiles. So that the TSP block 110 can process the parameters within a tile, the parameters indicated in the output from the ISP block 108 can be fetched from the parameter buffer 114 into the parameter cache 120. Some or all of the parameters used by the TSP block 110 for processing a tile may be different to those used by the ISP block 108 for processing the same tile. For example, the parameters used by the ISP block 108 may relate to the location of primitives, whereas the parameters used by the TSP block 110 may, additionally or alternatively, relate to texture and shading data to be applied to primitives. The TSP block 110 then reads the parameters from the parameter cache 120 for use in processing the tile, e.g. for implementing the texturing and shading. The parameters may include indications of textures (or specific texels from textures) that are to be applied to objects by the TSP block 110. The indicated textures (or texels) are fetched from the texture memory 116 into the texture cache 122 for use by the TSP block 110 in processing the tile, e.g. for implementing the texturing and shading.

The output from the TSP block 110 may be passed to further processing blocks (not shown in FIG. 1) within the processing unit 102 before being output from the processing unit 102, e.g. to a display buffer for display on a screen of the device on which the system 100 is implemented.

In the example shown in FIG. 1, the cache memories (118, 120 and 122) are on-chip memories which are smaller than the corresponding parameter buffer 114 and texture memory 116 stored in the memory 112, which may for example be a system memory. In other examples, at least one of the cache memories (118, 120 and/or 122) may not be implemented as an on-chip memory, i.e. may not be implemented on the same chip as the processing unit 102. The parameter caches 118 and 120 are usually smaller than that required to store all of the parameter blocks stored in the parameter buffer 114 that are needed in order to render all of the tiles in a scene (although the parameter caches 118 and 120 are usually large enough to store all of the parameters that are needed in order to render one of the tiles, but this may depend upon the quantity and complexity of the objects included in the tile). Similarly, the texture cache 122 is usually smaller than that required to store all of the textures stored in the texture memory 116 that are needed in order to render all of the tiles in a scene. So that the ISP block 108 can process all of the tiles, at least some of the parameters in the parameter cache 118 are evicted as further parameters are fetched into the parameter cache 118 from the parameter buffer 114. Similarly, at least some of the parameters in the parameter cache 120 and at least some of the texels in the texture cache 122 are evicted as further parameters/texels are fetched into the respective caches so that the TSP block 110 can process all of the tiles.

There are described herein eviction policies which may perform better than the LRU eviction policy described above. The performance of the eviction policies may be indicated by the proportion of cache read requests that result in cache hits, i.e. the hit ratio of the cache. The eviction policies are described in detail below with reference to the parameters in the parameter cache 118, but the same principles can be applied to the parameters in the parameter cache 120 and to the texels in the texture cache 122. Furthermore, the same principles of the eviction policies described herein can be applied to any suitable graphics data items which are stored in a cache for use in processing the tiles.

Figure 2:
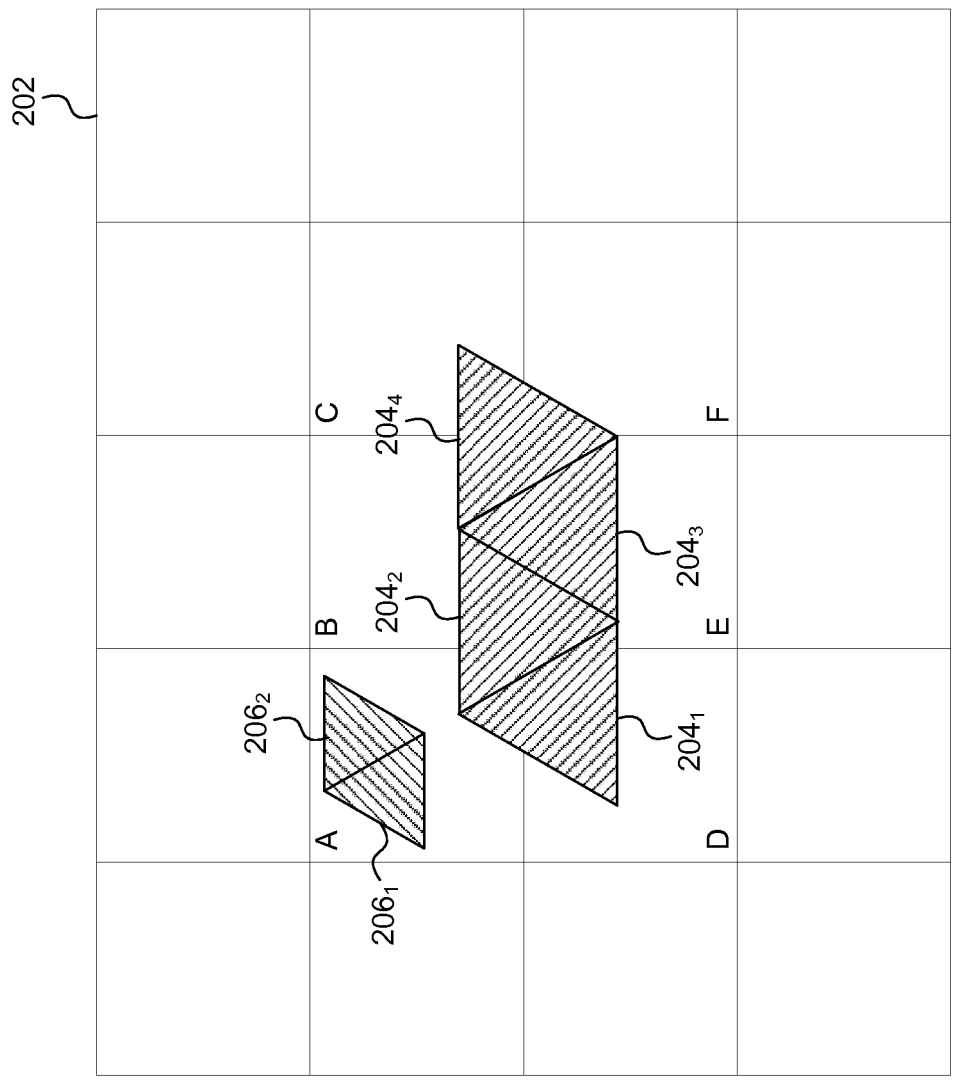
FIG. 2 represents objects included in a rendering space of a tile-based graphics system.

FIG. 2 is a simplified representation of a rendering space 202 of a tile-based graphics system comprising twenty tiles, arranged in a 5×4 array. Within the rendering space 202 are shown two objects 204 and 206. A first of the two objects comprises four primitives labelled $204_1$, $204_2$, $204_3$ and $204_4$. It can be seen that the first object overlaps with six of the tiles of the rendering space 202. These six tiles are in the middle of the 5×4 array of the rendering space 202 and are indicated as tiles A to F in FIG. 2. Where it is not explicitly stated, the term "overlap" used herein is to be understood to mean "at least partially overlap". It can be understood from FIG. 2 that the primitive $204_1$ overlaps with three tiles (tiles A, D and E), the primitive $204_2$ overlaps with four tiles (tiles A, B, D and E), the primitive $204_3$ overlaps with two tiles (tiles B and E) and the primitive $204_4$ overlaps with four tiles (tiles B, C, E and F). A second of the two objects comprises two primitives labelled $206_1$ and $206_2$. It can be seen that the second object overlaps with just one of the tiles of the rendering space 202. In particular, it can be understood from FIG. 2 that both of the primitives $206_1$ and $206_2$ overlap with only one tile, that being tile A. There will usually be other objects in the scene, likely comprising more primitives than the objects shown in FIG. 2, but these are not shown in FIG. 2 for clarity.

As described above, each object is stored in one or more parameter blocks in the parameter buffer 114. Each of the parameter blocks includes parameters describing primitives of at least one of the objects. FIG. 3a is a simplified diagram of a first parameter block ("Parameter Block 1") which comprises parameters describing the primitives of the first object 204. In particular, in the example shown in FIG. 3a, parameter block 1 stores: the parameter, $PB1_1$, which describes the primitive $204_1$; the parameter, $PB1_2$, which describes the primitive $204_2$; the parameter, $PB1_3$, which describes the primitive $204_3$; and the parameter, $PB1_4$, which describes the primitive $204_4$.

Figure 3B:
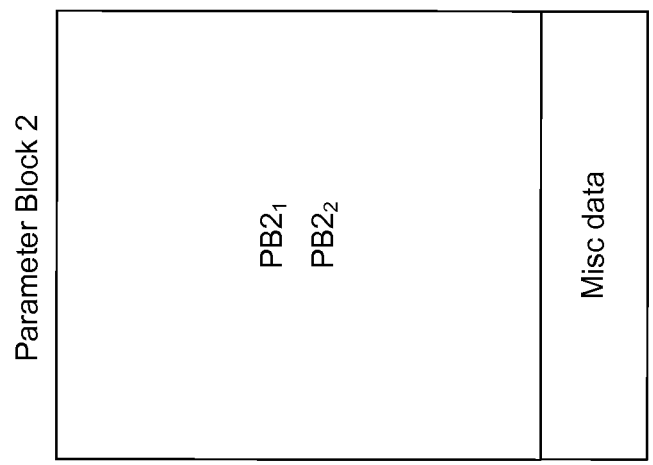
FIG. 3b shows a second parameter block.
Figure 3A:
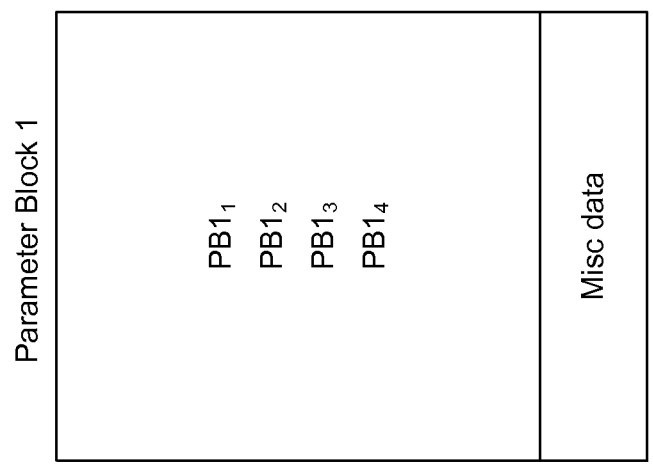
FIG. 3a shows a first parameter block.

Similarly, FIG. 3b is a simplified diagram of a second parameter block ("Parameter Block 2") which comprises parameters describing the primitives of the second object 206. In particular, in the example shown in FIG. 3b, parameter block 2 stores: the parameter, $PB2_1$, which describes the primitive $206_1$; and the parameter, $PB2_2$, which describes the primitive $206_2$.

The precise form of the parameters stored in the parameter buffer 114 may vary and may be more complicated than that shown in FIGS. 3a and 3b. For example, the parameter blocks may store vertex data for the different vertices within an object, whereby the parameters for a primitive include data of a group of the vertices (e.g. three vertices forming a triangle) to thereby describe the location of the primitive. In that case the parameter for a primitive is actually a group of parameters which may include data relating to a group of vertices. The parameter blocks may further store data other than the location data of the primitives (e.g. colour or texture data) as separate data items to the location data, such that the parameters for a primitive may include sets of location data combined with the other data for the primitive. It should therefore be appreciated that where FIGS. 3a and 3b show a parameter (e.g. $PB1_1$) relating to a primitive, the parameter may in fact include multiple data items from the parameter block which can be combined to describe the primitive. Furthermore, as shown in FIGS. 3a and 3b each of the parameter blocks includes a miscellaneous data field which comprises data relating to that parameter block. The data in the miscellaneous data field may include state data to indicate how the data in the parameter block should be interpreted.

Figure 4:
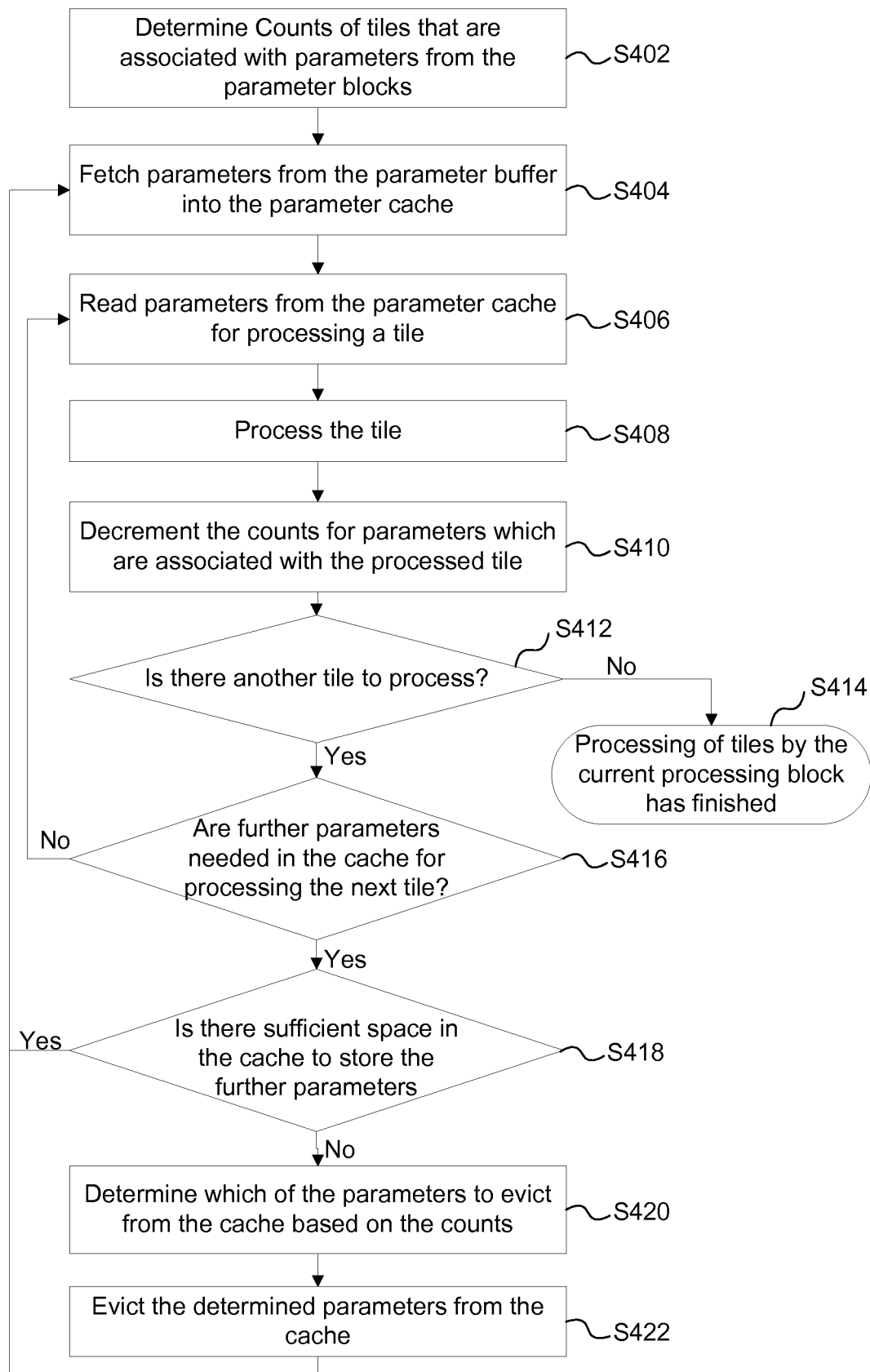
FIG. 4 is a flow chart for a method of processing data in a tile-based graphics system.

FIG. 4 shows a flow chart for a method of processing data in a tile-based graphics system, implementing a new eviction policy for evicting parameters from the parameter cache 118.

In step S402, for each of the parameter blocks, a count is determined of the number of tiles that overlap with at least one parameter of the parameter block. These counts therefore provide an indication of the number of tiles with which the parameters of a parameter block are associated. In other words, the count for a parameter block indicates how many of the tiles will be processed using at least one parameter from the parameter block. For example, the count for the Parameter Block 1 will be six because, as shown in FIG. 2, six tiles (tiles A to F) overlap with at least one primitive described by the parameters of Parameter Block 1 (i.e. primitives $204_1$, $204_2$, $204_3$ and $204_4$). Similarly, the count for the Parameter Block 2 will be one because, as shown in FIG. 2, only one tile (tile A) overlaps with at least one primitive described by the parameters of Parameter Block 2 (i.e. primitives $206_1$ and $206_2$).

In one example, tiling unit 106 determines the counts for the parameter blocks in step S402. This may be performed as part of the tiling process in which the display lists are derived for the tiles. The display list for a tile indicates the parameters which are to be used to process the tile. Alternatively, in step S402 the information in the display lists of the tiles may be used to determine, for each of the parameter blocks, the count of the number of tiles that overlap with at least one primitive described by the parameters of the parameter block. For each of the parameter blocks, the count that is determined in step S402 is stored in the miscellaneous data field of that parameter block in the parameter buffer 110. Two examples of how the counts may be determined from the tiling process are: (i) setting a flag corresponding to each tile position every time any primitive in a parameter block is found in that tile and then summing the number of flags at the end of the tiling process; or (ii) parsing the display lists for each tile and incrementing the parameter block counter whenever the parameter block is referenced.

In step S404, the ISP block 108 fetches parameters from the parameter buffer 114 into the parameter cache 118, as described above. The parameters that are fetched into the parameter cache 118 are those that are indicated in the display list of a current tile as being needed to process the current tile that the ISP block 108 is processing. As described above, the display list provides references to the parameter blocks in the parameter buffer 114 with masks to indicate the subset of parameters which are needed from the parameter blocks.

Figures 5, 6:
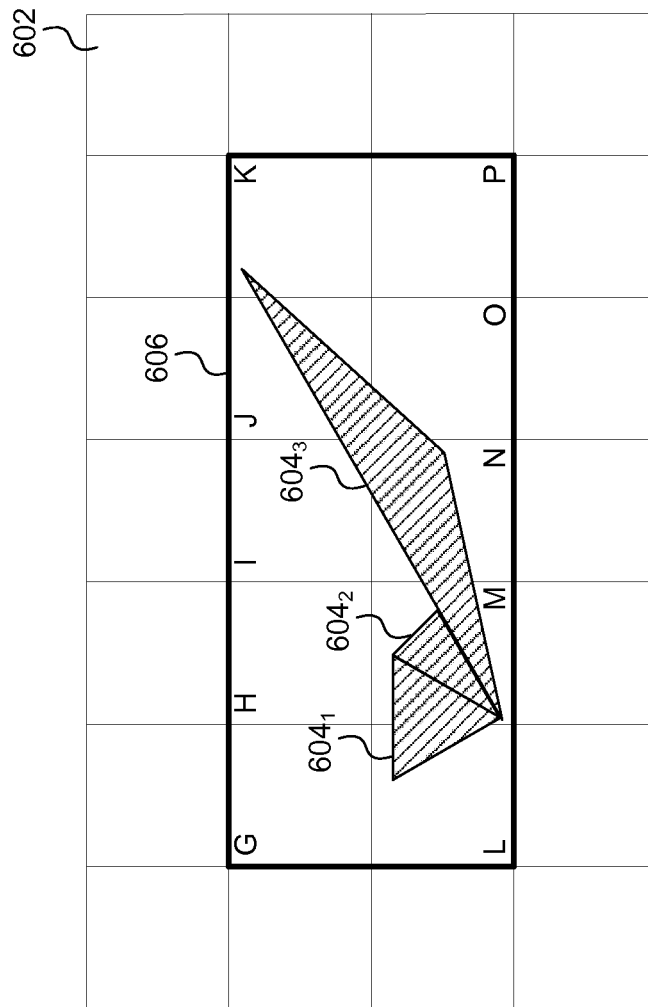
FIG. 5 shows a parameter cache.
FIG. 6 represents another object included in a rendering space of a tile-based graphics system.

For example, FIG. 5 shows parameters which are fetched into the parameter cache 118 by the ISP block 108 in order to process tile A shown in FIG. 2. Tile A overlaps with primitives $204_1$ and $204_2$ which are described by parameters $PB1_1$ and $PB1_2$ of Parameter Block 1 stored in the parameter buffer 114. Tile A also overlaps with primitives $206_1$ and $206_2$ which are described by parameters $PB2_1$ and $PB2_2$ of Parameter Block 2 stored in the parameter buffer 114. Therefore, in order for the ISP block 108 to process tile A, these four parameters ($PB1_1$, $PB1_2$, $PB2_1$ and $PB2_2$) are fetched from the parameter buffer 114 into the parameter cache 118 in step S404. The parameter cache 118 may include other parameters than those shown in FIG. 5. For example, the parameter cache 118 may include parameters that have been previously fetched for the processing of previous tiles by the ISP block 108.

When a parameter is fetched into the parameter cache 118, an indication of the count for the parameter's parameter block is also stored in the parameter cache 118. This is shown in FIG. 5 whereby the counts for the parameters in the parameter cache 118 are stored. As described above, the counts for the parameters $PB1_1$ and $PB1_2$ from Parameter Block 1 are six and the counts for the parameters $PB2_1$ and $PB2_2$ from Parameter Block 2 are one.

In step S406 the ISP block 108 reads the parameters from the parameter cache 118 that are indicated in the display list for tile A.

In step S408 the ISP block 108 processes tile A using the parameters indicated in the display list for tile A. Therefore, in the example shown in FIG. 2, the parameters $PB1_1$, $PB1_2$, $PB2_1$ and $PB2_2$ will be used by the ISP block 108 to process tile A. As described above the ISP block 108 may implement Hidden Surface Removal (HSR) by determining which of the primitives are visible at each fragment position and then removing parameters from the image which will not affect the rendered image. The tiles processed by the ISP block 108 are output for further processing in the processing unit 102, e.g. by the TSP block 110. Different tiles from the same rendering space may be processed in parallel (i.e. simultaneously) in different processing blocks (e.g. the ISP block 108 and the TSP block 110) in the processing unit 102.

When the ISP block 108 has processed tile A, then in step S410 the counts for the parameter blocks which have at least one parameter describing a primitive which overlaps with tile A may be decremented. Therefore, once the ISP block 108 has processed tile A, the count for Parameter Block 1 (stored in the miscellaneous data field of Parameter Block 1) is decremented from six to five and the count for Parameter Block 2 (stored in the miscellaneous data field of Parameter Block 2) is decremented from one to zero. Furthermore, the counts are also decremented for any of the parameters in the parameter cache 118 which are included in parameter blocks whose count is decremented. Therefore, when the ISP block 108 has processed tile A, the counts stored in the parameter cache 118 for the parameters from Parameter Blocks 1 and 2 will be decremented such that the count for parameters $PB1_1$ and $PB1_2$ in the parameter cache 118 will be decremented from six to five and the counts for the parameters $PB2_1$ and $PB2_2$ in the parameter cache 118 will be decremented from one to zero. Decrementing is an example and any self-consistent approach to setting an initial value and updating that value is acceptable.

Therefore, the counts for parameters of a parameter block are indicative of the number of tiles, that are still to be processed, that overlap with at least one parameter of the parameter block.

In step S412 it is determined (e.g. by the ISP block 108) whether there is another tile for the ISP block 108 to process. If there is not another tile for the ISP block 108 to process then the ISP block 108 has finished processing the tiles in the rendering space as indicated by reference S414 in FIG. 4. In this case the processing of the tiles will continue in subsequent processing blocks (e.g. the TSP block 110) in the processing unit 102.

However, if the ISP block 108 does have another tile to process then the method passes from step S412 to step S416. For example, when the ISP block 108 has processed tile A, it may then determine that tile B is to be processed. The ISP block 108 needs to read some parameters in order to process the next tile (e.g. tile B). The ISP block 108 will attempt to read the parameters from the parameter cache 118. In step S416 it is determined (e.g. by control logic of the parameter cache 118) whether the parameter cache 118 has the parameters that are needed for the ISP block 108 to process the next tile. That is, it is determined whether any further parameters are needed to be fetched into the parameter cache 118 for the ISP block 108 to process the next tile.

If it is determined in step S416 that the parameter cache 118 has all of the parameters required to process the next tile (i.e. that no further parameters are required to be fetched from the parameter buffer 114 into the parameter cache 118) then the method passes from step S416 back to step S406, wherein the ISP block 108 reads the appropriate parameters from the parameter cache 118 and in step S408 processes the next tile, in a similar manner to that described above in relation to tile A.

However, if it is determined that further parameters are needed in the parameter cache 118 in order for the ISP block 108 to process the next tile (e.g. tile B) then the method passes from step S416 to step S418. In the example that the next tile to be processed by the ISP block 108 is tile B then, as can be appreciated from FIG. 2, the ISP block 108 will need to use parameters $PB1_2$, $PB1_3$ and $PB1_4$ to process the tile. Parameter $PB1_2$ is already in the parameter cache 118 due to the processing of tile A, but parameters $PB1_3$ and $PB1_4$ are further parameters which are not in the parameter cache 118 and will need to be fetched from the parameter buffer 114. In step S418 it is determined (e.g. by control logic of the parameter cache 118) whether there is sufficient space in the parameter cache 118 to store the further parameters. If it is determined that there is sufficient space in the parameter cache 118 to store the further parameters then the method passes back to step S404 and the further parameters are fetched from the parameter buffer 114 into the parameter cache 118. The further parameters are then read by the ISP block 108 from the parameter buffer 118 in step S406 and the next tile (e.g. tile B) is processed in step S408, in a similar manner to that described above in relation to tile A.

However, if it is determined in step S418 that there is not sufficient space in the parameter cache 118 to store the further parameters (e.g. parameters $PB1_3$ and $PB1_4$ for processing tile B) then one or more of the parameters that are present in the parameter cache 118 will need to be evicted from the parameter cache 118 when the further parameters are fetched into the parameter cache 118. In this case, the method passes to step S420 in which it is determined (e.g. by control logic of the parameter cache 118) which of the parameters should be evicted from the parameter cache 118. The determination as to which of the parameters to evict from the parameter cache 118 is based on the counts of the parameters in the parameter cache 118. For example, it may be determined that the parameter(s) with the lowest count(s) in the parameter cache 118 are to be evicted from the parameter cache 118.

As described above the counts for parameters of a parameter block are indicative of the number of tiles that overlap with at least one primitive described by parameters of the parameter block. Furthermore, due to the decrementing of the counts as the tiles are processed, the counts for parameters of a parameter block are indicative of the number of tiles, that are still to be processed, that overlap with at least one primitive described by parameters of the parameter block. Therefore the count of a parameter in the parameter cache 118 provides an indication of the likelihood of that parameter being used in the next tile that is processed. Therefore, evicting the parameter(s) with the lowest count(s) is a useful eviction policy because parameters in the parameter cache 118 which are less likely to be used for processing the next tile (i.e. parameters which have lower counts) are evicted before parameters in the parameter cache 118 which are more likely to be used for processing the next tile (i.e. parameters which have higher counts).

In step S422 the parameters which were determined in step S420 to be suitable for eviction from the parameter cache 118 (e.g. those in the parameter cache 118 which have the lowest counts) are evicted from the parameter cache 118. The method then passes back to step S404 and the further parameters are fetched from the parameter buffer 114 into the parameter cache 118. The eviction in step S420 may be performed by fetching new parameters to replace the evicted parameters. Alternatively, an active eviction step may be carried out whereby parameters are evicted (e.g. by setting a flag to be "invalid" for the relevant cache line in the parameter cache 118) before the step of fetching new parameters to replace the evicted parameters. The further parameters are then read by the ISP block 108 from the parameter buffer 118 in step S406 and the next tile (e.g. tile B) is processed in step S408, in a similar manner to that described above in relation to tile A.

In the example shown in FIGS. 2 and 5, when tile A has been processed the parameters $PB1_1$, $PB1_2$, $PB2_1$ and $PB2_2$ are in the parameter cache 118. The counts of $PB2_1$ and $PB2_2$ are lower than the counts of $PB1_1$ and $PB1_2$, so the parameters $PB2_1$ and $PB2_2$ are evicted from the parameter cache 118. This makes space in the parameter cache 118 for further parameters. If tile B is the next tile to be processed then the parameters $PB1_3$ and $PB1_4$ are fetched into the parameter cache 118 from the parameter buffer 114, such that the parameter cache 118 will include the four parameters $PB1_1$, $PB1_2$, $PB1_3$ and $PB1_4$ from parameter block 1. It can be seen from FIG. 2 that parameters $PB1_2$, $PB1_3$ and $PB1_4$ are needed by the ISP block 108 to process tile B. It was a good decision to evict parameters $PB2_1$ and $PB2_2$ from the parameter cache 118 because those parameters are not needed to process tile B. It was also a good decision not to evict parameter $PB1_2$ from the parameter cache 118 because that parameter is needed to process tile B.

The eviction policies based on the counts of the parameters as described herein may perform better than a LRU eviction policy in the example shown in FIGS. 2 and 5. If the parameters are used by the ISP block 108 to process tile A in the order that they are shown in FIG. 5 in the parameter cache 118, then using a LRU eviction policy may result in parameters $PB1_1$ and $PB1_2$ being evicted from the parameter cache 118 when tile A has been processed whereas parameters $PB2_1$ and $PB2_2$ may not be evicted from the cache 118 at that point. It can be appreciated from FIG. 2 that parameters $PB2_1$ and $PB2_2$ (describing primitives $206_1$ and $206_2$) will not be needed again to process any tile other than tile A and therefore it is not useful to keep these parameters in the parameter cache 118. In contrast, parameters $PB1_1$, $PB1_2$, $PB1_3$ and $PB1_4$ (describing primitives $204_1$, $204_2$, $204_3$ and $204_4$) will be needed again to process other tiles and therefore it may be useful to keep these parameters in the parameter cache 118. Eviction policies described herein weight the eviction of parameters from the parameter cache 118 based on tile coverage. As can be seen in the examples given above, these eviction policies may result in a higher cache hit rate compared to a LRU eviction policy. This means that fewer calls to the parameter buffer 114 in memory 112 are needed to fetch parameters into the parameter cache 118. Accessing memory 112 may be a slow process compared to other processes carried out by the processing unit 102 so reducing the number of memory accesses allows for faster processing by the processing unit 102.

The example of Parameter Block 2 given above is a good example of where the eviction policies described herein perform better than a LRU eviction policy. Every member primitive of Parameter Block 2 is entirely located within one tile (tile A). Once that tile has been processed there is no reason to keep the parameters $PB2_1$ and $PB2_2$ of Parameter Block 2 in the parameter cache 118. Under an LRU policy however the parameters of Parameter Block 2 will typically reside in the parameter cache 118 for a prolonged period, reducing the efficiency of the parameter cache 118. As scene complexity increases, geometry gets smaller and the situation in which every member primitive of a parameter block is entirely located within one tile becomes increasingly common.

Eviction policies described herein consider how many tiles a parameter block overlaps with. Parameters from a parameter block containing primitives which overlap with only one or a small number of tiles are less likely to be required again to process another tile than parameters from a parameter block which contains primitives that overlap with many tiles. This realisation leads to the eviction policies which weight the eviction of parameters of parameter blocks from the parameter cache 118 based on tile coverage.

As described above, a count is maintained for each of the parameter blocks of the number of tiles overlapped by the primitives in that parameter block. When an eviction from the parameter cache is required, a parameter from the parameter block with the lowest counter is chosen for eviction. If multiple parameters are present in the parameter cache 118 with the same count value, then a conventional eviction policy (such as LRU) may be used to determine which of those parameters is to be evicted. Due to the locality of the input data, parameters (e.g. defining objects) found in one tile are likely to be used again in an adjacent tile, such that when tiles are processed in sequential order, the LRU eviction policy is a good default choice for determining which parameters to evict from the parameter cache in the event that multiple parameters are present in the parameter cache 118 with the same count value.

In the examples described above, the count is decremented for a parameter of a parameter block if any of the parameters within that parameter block are used to process a tile. Therefore, the counts for parameters in the parameter cache 118 may reach zero, which indicates that those parameters will not be used again to process further tiles in the rendering space 202. As such those parameters will not be needed in the parameter cache 118. Therefore if the count for a parameter in the parameter cache 118 reaches zero then that parameter may be evicted from the parameter cache 118. Evicting parameters with count values of zero helps to maximise the parameter cache usage, thereby reducing the number of calls to the memory 112 that are needed.

As described above, the number of tiles overlapped by primitives in a parameter block can be determined in several ways known to those skilled in the art. For example, a list of the overlapping tiles may be stored in the parameter block during the tiling of the primitives by the tiling unit 106.

In another example, as illustrated in FIG. 6, a conservative bounding box 606 may be constructed in a rendering space 602 for a parameter block. In the simple example shown in FIG. 6, parameters of three primitives $604_1$, $604_2$ and $604_3$ are included in a parameter block, and the bounding box 606 is the smallest rectangular array of tiles (labelled G to P in FIG. 6) which comprises all of the tiles which overlap with at least one of the primitives of the parameter block. As illustrated in FIG. 6, primitive $604_1$ overlaps tiles L and M; primitive $604_2$ overlaps tile M; and primitive $604_3$ overlaps tiles I, J, K, M, N and O. The number of tiles included in the bounding box 606 can be used as the count for the parameters of the parameter block. It can readily be seen that none of the primitives shown in FIG. 6 overlap tiles G, H or P, but that tiles G, H and P are included in the bounding box 606. Therefore, if the bounding box method is used to determine the counts for the parameters in the parameter block shown in FIG. 6 then the counts will be determined to be ten even though only seven of the tiles (tiles I, J, K, L, M, N and O) actually overlap with at least one of the primitives of the parameter block. The count for a parameter of a parameter block is therefore not necessarily strictly equal to the number of tiles that overlap at least one primitive described by parameters of the parameter block.

In the examples given herein, rectangular bounding boxes are used which are simple to implement and well matched to rectangular tiles. However, a rectangular bounding box is just one example of a bounding region which may be used. Other bounding regions may be used. For example, tighter bounds such as spheres and polynomials may be used in a similar manner as that described herein for the rectangular bounding boxes. Methods also exist for optimizing the rectangular bounding box. In the example of FIG. 6, such a method may exclude non-overlapped tiles G, H, and P to produce the minimal set of seven tiles overlapped by the primitives of the parameter block for use as the bounding region.

In general, the count for a parameter can be considered to be an indicator of the number of tiles with which the parameter is associated. Any suitable indicator may be used. The count is used as a weighting to be used to determine which parameters are to be evicted from the parameter cache 118. As such, the count is not required to be exactly correct in specifying the number of tiles with which a parameter is associated, provided that it gives an approximate indication of the number of tiles with which a parameter is associated. In this way, the counts allow the number of tiles with which a first parameter is associated to be compared (approximately, even if not exactly) to the number of tiles with which a second parameter is associated to determine which of the parameters is associated is fewer tiles, and is therefore a suitable candidate for eviction from the parameter cache 118. A particular parameter may be considered to be associated with a particular tile if a parameter in the parameter block comprising the particular parameter is to be used to process the particular tile (i.e. one of the primitives of the parameter block overlaps the particular tile). When the bounding box method is used, a particular parameter may be considered to be associated with a particular tile if the bounding box including the particular parameter overlaps the particular tile.

In the examples described above, each parameter block has its own count. However, in other examples, the granularity of the counts may be different. For example, each parameter may have its own count, which may be different to the counts of other parameters of the same parameter block, and which is indicative of the number of tiles associated with that parameter, e.g. the number of tiles which are to be processed using the parameter. Determining the number of tiles associated with a parameter may include using the display lists generated by the tiling unit 106 during tiling of the primitives in the scene. Alternatively, each parameter may have its own conservative bounding box which is used to determine the number of tiles associated with that parameter. As another example, each block of data (e.g. comprising multiple parameters) that can be loaded into a cache line of the parameter cache 118 may have its own count, which is indicative of the number of tiles which are to be processed using at least one parameter in the block of data. In all of these examples, irrespective of the granularity of the counts, a count is determined for each of the parameters. For example, when the counts are at the granularity of the parameter blocks, the step of determining a count for a parameter block will determine the counts for each of the parameters of that parameter block, i.e. each of the parameters in the parameter block have a count equal to that which has been determined for the parameter block.

When a tile is processed and the counts are decremented, it should be the case that the count for every parameter that is associated with the processed tile is decremented. The determination as to which of the parameters are associated with a processed tile for the purpose of decrementing the counts should match the determination as to the number of tiles with which the parameters are associated when determining the counts. For example, if the bounding box method is used to determine the counts (e.g. such that all of the parameters shown in FIG. 6 are determined to be associated with all ten of the tiles G to P, thereby setting the counts for the parameters to be ten) then when any of the tiles in the bounding box is processed the counts for the parameters within the bounding box should be decremented. This is true even for processing tiles in the bounding box which do not overlap with any of the primitives in the parameter block, e.g. for processing tiles G, H and P.

In the examples given above, the counts for parameters are decremented as tiles associated with the parameters are processed. However, in other examples, the counts are not decremented, i.e. step S410 is omitted from the method in the examples described with reference to FIG. 4. In examples in which the counts are not decremented the counts for parameters of a parameter block are indicative of the number of tiles in the rendering space 202 that overlap with at least one parameter of the parameter block, irrespective of whether the tiles have already been processed. An eviction policy such as this, in which the counts are not decremented, may still perform better than a LRU eviction policy (in terms of a cache hit ratio), although it may not perform as well as the eviction policies described herein which do implement the decrementing counters (in terms of a cache hit ratio). However, the cost of including the processing required to implement the decrementing counters may, in some scenarios, outweigh the benefits obtained by decrementing counters, such that in some scenarios implementing an eviction policy which does not decrement the counters may be beneficial.

In the examples above, it is not described that there is an upper limit to the values of the counts. However, in practical systems, it is likely that the number of bits allocated to be used for the counts is limited. For example, N bits could be used to represent each of the counts, with the possible values of the counts, denoted C, being an integer in the range: $0 \leq C \leq 2^N - 1$. Therefore there is a predetermined maximum value that the count can take, $C_{max}$, which is given by $2^N - 1$. For example, three bits may be used to represent each of the counts, such that the value of $C_{max}$ is 7. Therefore, in this example, the values of the counts, C, can be in the range: $0 \leq C \leq 7$. It is useful to limit the number of bits used to represent each of the counts so that the amount of memory used to store the counts is limited. This is particularly true when the counts are stored in two places, e.g. in the miscellaneous field in a parameter block in the parameter buffer 114 and in the parameter cache 118 as shown in FIG. 5. The memory of the parameter cache 118 is in high demand, so placing a limit on the number of bits that are used for the counts may be useful because the counts are stored in the parameter cache 118.

When the number of tiles with which a parameter is associated is determined, as described above, if the number of tiles with which a parameter is associated is greater than the predetermined maximum ($C_{max}$), then the value of the count is set to be equal to the predetermined maximum ($C_{max}$). In other words, if the value of the count for a parameter is set at $C_{max}$ this indicates that the number of tiles with which that parameter is associated is greater than or equal to $C_{max}$. When there is a limit to the value of the count, then for all count values less than the maximum (i.e. for $C<C_{max}$) then the count values may be decremented in the same way as described above as the tiles are processed. However, when the count value is set to the maximum value (i.e. for $C=C_{max}$) then the count values are not decremented as the tiles are processed. In other words, the count value is decremented only if the count is less than the predetermined maximum ($C_{max}$). This is because a count value of $C_{max}$ for a parameter does not uniquely indicate the number of tiles associated with that parameter. A count value of $C_{max}$ indicates that the number of tiles associated with that parameter is greater than or equal to $C_{max}$. Therefore, decrementing the count value may not be useful when the count value is set to be $C_{max}$.

However, in some examples a count value of $C_{max}$ may be decremented. This may be beneficial by reducing the likelihood of parameters with count values of $C_{max}$ from remaining in the parameter cache 118 after they are needed by the ISP block 108 for processing tiles. In some examples, where the count value for a parameter is stored in the parameter cache 118 and in the parameter buffer 114, as in examples described above, a count value of a parameter of $C_{max}$ in the parameter cache 118 may be decremented but the corresponding count value of the parameter (e.g. of the parameter block) in the parameter buffer 114 may not be decremented. In this way, the parameter may be evicted from the parameter cache 118 as the count value is decremented, but if the parameter is subsequently re-loaded into the parameter cache 118 it will be re-loaded with a count value of $C_{max}$. In some other examples, a decision may be made as to whether to decrement the count value of a parameter with a count value of $C_{max}$, based on a condition, such as the occupancy of the parameter cache 118, or the number of other parameters in the parameter cache 118 which have count values of $C_{max}$.

It is described above that the count value, denoted C, is an integer in the range: $0 \leq C \leq 2^N - 1$. However, the count values may instead be in the range $1 \leq C \leq 2^N$, thereby allowing an extra count value to be represented, at the expense of not being able to represent a count value of zero. However, it may not be necessary to be able to represent a count value of zero. For example, rather than decrementing a count value of one to a count value of zero, the count value may remain at one and the cache entry corresponding to the parameter may be invalidated. A cache entry may be invalidated by setting a flag in the parameter cache 118 to indicate that the parameter is invalid. Alternatively, a cache entry may be invalidated by setting a tag or address to a predefined value, e.g. all bits set to zero or all bits set to one. It is known to invalidate cache entries in caches to indicate data in a cache that can be overwritten when new data is fetched into the cache. Therefore, the count value of zero is not needed and the maximum count value ($C_{max}$) that can be represented can be increased by one without increasing the number of bits used to represent the count values. It is noted that an "invalid" state (indicated for example with an "invalid flag" or by setting a tag or address to a predefined value, e.g. all bits set to zero or all bits set to one) is implemented in most caches to indicate whether lines of the cache are empty or whether they hold genuine data. Therefore, the process of invalidating a cache entry (e.g. by setting an invalid flag, or by setting a tag or address to a predefined value), as described above to extend the range of count values that can be represented, may not involve using any extra bits that would not already be used by the cache. This is because the cache may already implement a method for invalidating cache entries (e.g. using an "invalid flag" or setting a tag or address to a predefined value, e.g. all bits set to zero or all bits set to one).

In one example use case, just one bit is used to represent each of the counts. In relation to the example given above, this can be thought of as setting N to be one, such that $1 \leq C \leq C_{max}$, where $C_{max}$ is equal to two. The count in this example is therefore a one-bit flag, which can take either a first value or a second value. The value of the count for a parameter can therefore be used to indicate one of two conditions. If the count for a parameter has the first value (which is denoted $C_1$ herein) this indicates that the number of tiles with which that parameter is associated is equal to one. If the count has the second value (which is denoted $C_{>1}$ herein) this indicates that the number of tiles with which that parameter is associated is greater than one.

This use case has some particular benefits. Since only one bit is used for the count values, the data required to store the counts and transmit the counts between the processing unit 102 and the system memory 112 is small compared to examples where more than one bit is used for the count values. Furthermore, it has been observed that parameter blocks may have parameters which are associated with only one tile. Furthermore, as scene complexity increases, geometry gets smaller and it gets more likely that a parameter block for a piece of geometry (e.g. an object) has parameters which are associated with only one tile.

In an example in which just one bit is used for the counts, the count values are not decremented as the tiles are processed. Instead, the eviction policy condenses down to determining which of the parameters in the parameter cache have counts which have the first value $C_1$ indicating that the parameters are only present in one tile, whereby these parameters are good candidates for eviction from the parameter cache 118. Parameters which have counts having the value $C_{>1}$ are not good candidates for eviction from the parameter cache 118 and are weighted to reduce the likelihood of eviction from the parameter cache 118 relative to the likelihood of parameters with counts of $C_1$ being evicted from the parameter cache 118. As described above, if we need to discriminate between parameters to determine which parameter to evict from the cache when the counts for the parameters have the same value, then another eviction policy such as a LRU eviction policy may be used. It should be appreciated that, any parameter in the parameter cache 118 which has been used to process a tile and which has a count value of $C_1$ (indicating that the parameters are associated with only one tile) will not be used again to process another tile and therefore can be evicted from the parameter cache 118.

In another example use case, two bits are used to represent each of the counts. The count in this example is therefore a two-bit flag, which can take one of four possible values. The value of the count for a parameter can therefore be used to indicate one of four conditions. If the count for a parameter has a first value (which is denoted $C_1$ herein) this indicates that the number of tiles with which that parameter is associated is equal to one. If the count has a second value (which is denoted $C_2$ herein) this indicates that the number of tiles with which that parameter is associated is equal to two. If the count has a third value (which is denoted $C_{34}$ herein) this indicates that the number of tiles with which that parameter is associated is equal to three or four. If the count has a fourth value (which is denoted $C_{>4}$ herein) this indicates that the number of tiles with which that parameter is associated is greater than four.

Figure 7:
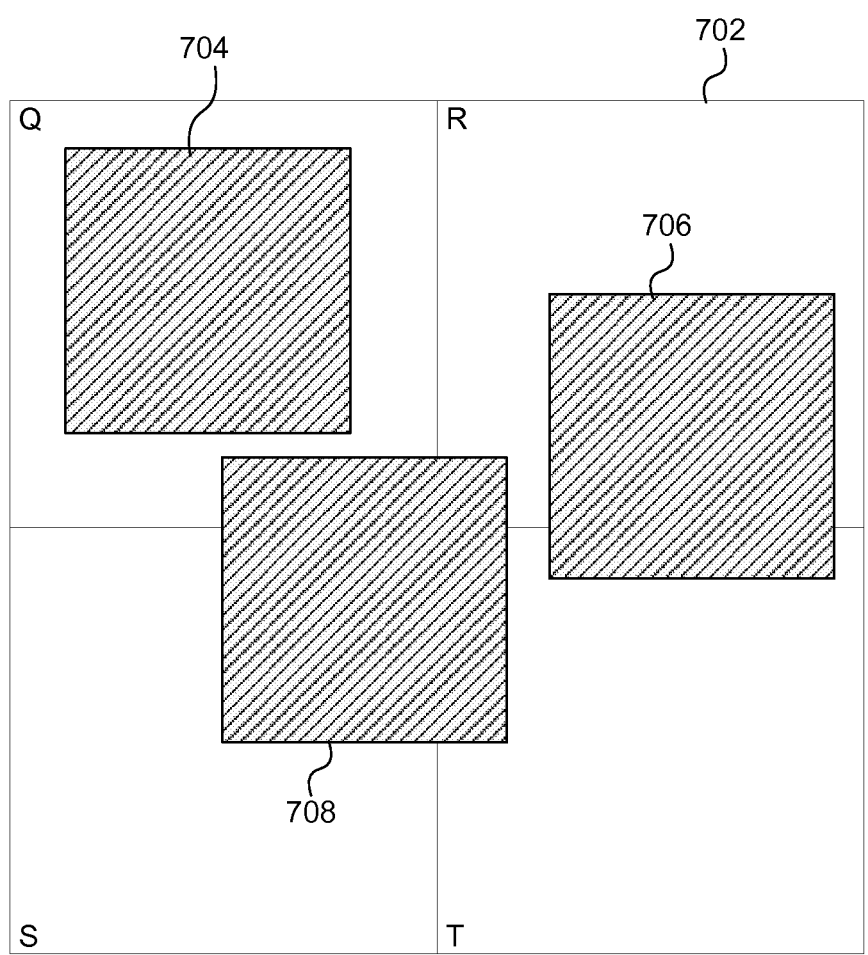
FIG. 7 represents further objects included in a rendering space of a tile-based graphics system.

This use case is useful because while small objects may contain primitives that fit within a single tile it is common for those objects to be intersected by tile boundaries. The common case of small objects intersected by a single tile edge will result in parameter blocks located in only two tiles. Similarly, objects may be intersected by both the horizontal and vertical tile edges resulting in parameter blocks located in either three or four tiles. Therefore, it is not unusual for a parameter block relating to an object to have parameters which are associated with one, two, three or four tiles, and it may be useful to be able to distinguish between these situations when determining which parameters to evict from the parameter cache 118 as well as distinguishing these cases from parameter blocks which have parameters associated with more than four tiles. FIG. 7 shows four tiles (denoted Q, R, S and T) of a rendering space 702. Three objects (denoted 704, 706 and 708) are shown in the rendering space 702. It can be seen that object 704 overlaps with just one of the tiles (tile Q); object 706 overlaps with two of the tiles (tiles R and T); and object 708 overlaps with all four of the tiles (tiles Q, R, S and T). The difference in the number of overlapping tiles of the objects is due to the difference in alignment of the objects to the tiling of the rendering space 702. According to the example use case being described, the parameters in the parameter block for object 704 will have counts with the value $C_1$ because object 704 overlaps only one tile; the parameters in the parameter block for object 706 will have counts with the value $C_2$ because object 706 overlaps two tiles; and the parameters in the parameter block for object 708 will have counts with the value $C_{34}$ because object 708 overlaps four tiles. The parameters in a parameter block for an object that covers more than four of the tiles are given count values of $C_{>4}$.

The parameters are evicted from the parameter cache 118 based on their count values. In particular, parameters with count values of $C_1$ will be evicted from the parameter cache 118 preferentially ahead of parameters with count values of $C_2$ which themselves will be evicted from the parameter cache 118 preferentially ahead of parameters with count values of $C_{34}$, which themselves will be evicted from the parameter cache 118 preferentially ahead of parameters with count values of $C_{>4}$. It can be appreciated that when tile Q has been processed the parameters relating to object 704 are not needed for processing any of the other tiles, and due to the count value of those parameters being $C_1$ those parameters will be evicted from the parameter cache 118 ahead of the parameters relating to object 708 which have count values of $C_{34}$ and which are needed for processing the other tiles (tiles R, S and T) shown in FIG. 7.

Using two bits for the count values is particularly useful because it distinguishes between four common scenarios, and therefore will provide a significant improvement in the cache hit ratio compared to a LRU eviction policy. Furthermore, this is achieved whilst requiring only 2 bits of data for each count value. This is advantageous in terms of storing the count values and transmitting the count values between the parameter buffer 114 on the memory 112 and the parameter cache 118 on the processing unit 102.

When two bits are used for the counts, the count values of $C_1$, $C_{34}$ and $C_{>4}$ may not be decremented as the tiles are processed. The count value of $C_1$ has no lower value to be decremented to. The count values of $C_{34}$ and $C_{>4}$ do not uniquely define the number of tiles that are associated with a parameter and as such are not decremented as the tiles are processed. However, a count value of $C_2$ does indicate that a parameter is associated with two tiles and the count value of $C_2$ may be decremented to the count value $C_1$. Therefore, the count value of a parameter with a count of $C_2$ may, or may not, be decremented to be a count of $C_1$ when a tile associated with that parameter is processed. In other examples, a count value of $C_{>4}$ may be decremented to a count value of $C_{34}$. Furthermore, a count value of $C_{34}$ may be decremented to a count value of $C_2$. As described above in relation to the decrementing of count values of $C_{max}$, the count values $C_{34}$ and $C_{>4}$ may be decremented in the parameter cache 118, whist not being decremented in the parameter buffer 114. Furthermore, rather than decrementing a count value of $C_1$, when a tile is processed with which a parameter is associated which has a count value of $C_1$, the count value of the parameter may remain as $C_1$ but a cache invalid flag may be set for the parameter to indicate that the parameter may be overwritten in (i.e. evicted from) the parameter cache 118 when further parameters are fetched into the parameter cache 118.

In the examples described above, the counts are stored in the parameter cache 118 and in the parameter buffer 114. However, in other examples, the counts may be stored only in the parameter buffer 114 and for each of the parameters in the parameter cache 118 there is stored in the parameter cache 118 a reference for referencing the counts for the parameters from the parameter buffer 114. In that case, when determining which of the parameters to evict from the parameter cache 118, the references of the parameters in the parameter cache 118 are used to determine the counts for the parameters in the parameter cache 118 by referencing the counts stored in the parameter buffer 114, and then the counts are used to determine which parameter to evict (e.g. the parameter(s) with the lowest count value(s)). This example may save some memory space in the parameter cache 118 because the count values are not needed to be stored in the parameter cache 118. The references are stored in the parameter cache 118 which may use fewer bits of memory than storing the counts themselves in the parameter cache 118. This may be useful because the memory space in the parameter cache 118 is limited. However, delay may be added to the processing of the tiles to allow time for the counts to be retrieved from the parameter buffer 114 in order to determine which parameters to evict from the parameter cache 118.

The examples described above relate to the eviction of parameters from the parameter cache 118. The same principles of the eviction policies can be applied to other caches in the processing unit 102. That is, for any graphics data items which are used to process tiles and which are fetched from an graphics data memory in the memory 112 into a cache on the processing unit 102, indicators may be determined for the graphics data items such that for each of the graphics data items, the indicator for that graphics data item is indicative of the number of tiles with which that graphics data item is associated. The indicators can then be used to determine which of the graphics data items to evict from the cache, such that the eviction policy is based on the tile coverage of the graphics data items. The graphics data items may for example be parameters or texels, which may be stored in graphics data sets such as parameter blocks or textures in the memory 112.

For example, the parameter cache 120 which is used by the TSP block 110 may use an eviction policy corresponding to those described above in relation to the parameter cache 118 used by the ISP block 108. That is, each of the parameters may be fetched into the parameter cache 120 with an associated count. The count used in the parameter cache 118 is separate to the count used in the parameter cache 120. As described above, the counts used by the ISP block 108 (and stored in parameter cache 118) are determined from the tiling performed by the tiling unit 106. Those same count values may be used by the TSP block 110 (and stored in parameter cache 120), or different counts may be used by the TSP block 110 (and stored in parameter cache 120) which may, for example, be determined based on the results of the Hidden Surface Removal (HSR) performed by the ISP block 108 (e.g. such that the counts for the TSP block 110 may be lower than the counts for the ISP block 108). Similar to in the examples described above in relation to the counts used by the ISP block 108, in some examples, each parameter block has a separate count (for use by the TSP block 110) of the number tiles with which at least one of the parameters of that parameter block is associated. The count for the TSP block 110 is used in the same way as described above in relation to the count for the ISP block 108, in order to determine which parameters to evict from the parameter cache 120, and may be decremented in the same way.

In the examples described above, there are two separate parameter caches: parameter cache 118 used by the ISP block 108 and parameter cache 120 used by the TSP block 110. In other examples there may be a single ("unified") parameter cache which could be used by both the ISP block 108 and the TSP block 110. Even when a single cache is used, separate counts would be used for the ISP block 108 and the TSP block 110. However, when a single parameter cache is used one of the processing blocks (ISP block 108 or TSP block 110) may evict parameters required by the other one of the processing blocks (TSP block 110 or ISP block 108) and vice versa. This would result in "thrashing" of the parameter cache. Therefore, using a single parameter cache for use by both the ISP block 108 and the TSP block 110 may reduce the effectiveness of the caching of the parameters in the processing unit 102. However, it is possible that it could be beneficial to use a single parameter cache.

As another example, the texture cache 120 which is used by the TSP block 110 may use an eviction policy corresponding to those described above in relation to the parameter caches 118 and 120. The texture memory 116 resides in the memory 112 and stores textures. Each texture includes one or more texels which can be applied to primitives of an object. The parameters of an object may indicate a portion of a texture which is to be applied to the primitives of the object when processing a tile in the TSP block 110. When the TSP block 110 processes a tile, the appropriate texels from the indicated texture are fetched from the texture memory 116 into the texture cache 122. In the same ways that counts can be determined for the parameters as described above, counts can be determined for the texels to indicate the number of tiles with which the texels are associated. For example, the counts may be determined on the granularity of the textures (in the same way that counts are determined on the granularity of the parameter blocks as described above), whereby each texel within a texture is given the same count value, which indicates the number of tiles with which texels from that texture are associated. When texels are required to be evicted from the texture cache 122, the counts for the texels in the texture cache 122 can be used to determine which texels to evict from the texture cache 122. That is, the eviction of texels from the texture cache 122 is weighted based on the number of tiles with which the texels are associated.

The order in which tiles within a rendering space are processed may be determined. Many factors may contribute to determining the order in which tiles are to be processed. For example, simple ordering schemes include raster scanning, where tiles are processed one row of tiles at a time, from top to bottom, and within each row of tiles the ordering is left to right. Other ordering schemes such as Boustrophedon ordering and Morton ordering are common. Processing of the tiles may be implemented in a multithreaded manner, and it may, or may not, be beneficial to group together the tiles that are to be processed in one thread. As another example, a load balancing technique may be used to determine the order in which tiles are processed, the details of such techniques are beyond the scope of this description.

The examples described above relate to implementing an eviction policy for evicting graphics data items (e.g. parameters or texels) from a cache. As part of the implementation of this eviction policy, indicators (or "counts") are included in the cache for the graphics data items to indicate the number of tiles with which each of the graphics data items is associated. These indicators may be used in the determination of the order in which the tiles are to be processed. The influence of the indicators on the determination of the order in which the tiles are to be processed may be smaller than other factors which are considered in the determination, but with other factors being equal, the indicators in the cache may determine the order in which tiles are processed. It may be beneficial to process tiles which are to be processed using graphics data items which are already in the cache, rather than needing to fetch graphics data items into the cache. In examples in which the indicators are decrementing counts as described above then it may be beneficial to preferentially drive counts towards zero for graphics data items with relatively low count values such that they will be evicted from the cache (thereby freeing up space in the cache for other graphics data items), and will not be needed for processing other tiles. This can be done by choosing to process tiles which are associated with those graphics data items. The display lists for the tiles can be used to determine which of the tiles are associated with which of the graphics data items. It could be that in other scenarios, tiles are chosen to be processed to thereby reduce the counts of graphics data items with relatively high count values in the cache.

Generally, any of the functions, methods, techniques or components described above can be implemented hardware (e.g., fixed logic or function circuitry), hardware configured by firmware or software, or any combination of these implementations. In order to clarify aspects of the disclosure, descriptions of some portions systems that implement these aspects are grouped, and referred to as "modules", "components", "blocks" or "units" for performing one or more specified functions or sets of functions, where such functions may themselves have constituent functions or other operations. The implementation of such modules, components and units may vary and can include fixed logic or function circuitry), hardware configured by firmware or software, or any combination of these implementations. Similarly, a 'processor' or a 'computer' refers to any device, or portion thereof, that includes such modules, components, or units, or which can be configured to implement same.

For example, the term "unit" can describe a collection of circuits, such as one or more of fixed function circuits, and circuits formed by configuring a programmable processor, to perform a stated function or collection of functions that logically relate to each other. For example, a "tiling unit" describes circuitry that implements a tiling function, while an "image synthesis processing unit" describes circuitry for synthesizing image data, and which uses inputs from a "tiling unit". The scope of these various terms depends on a context in which they are used. For example, some implementations may characterize vertex shading and viewpoint transformation as being implemented in a geometry processing unit or phase that precedes a tiling unit or phase, while other implementations may characterize these functions as being implemented in tiling unit and part of a tiling phase. As such, a processor may both include and be a tiling unit, an image synthesis processor, a texture and shading processor, and so on.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a non-transitory machine or computer readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of processing data in a graphics system wherein graphics data items are associated with tiles within the graphics system, the method comprising:
    storing graphics data items in a cache, wherein each of the graphics data items in the cache is associated with an indicator which is indicative of a number of tiles with which the graphics data item is associated; and
    determining an order in which tiles are to be processed based on the indicators of the graphics data items in the cache.

2. The method of claim 1, further comprising evicting a graphics data item from the cache in dependence on the indicator associated with the graphics data item.

3. The method of claim 1, further comprising determining the indicators for the graphics data items stored in the cache.

4. The method of claim 1, further comprising processing graphics data items from the cache in accordance with the determined order.

5. The method of claim 1, wherein for each of the graphics data items, the indicator is a count of the number of tiles with which that graphics data item is associated.

6. The method of claim 5, further comprising decrementing the count for a particular graphics data item when a tile with which the particular graphics data item is associated has been processed.

7. The method of claim 5, further comprising evicting, from the cache, the graphics data item which has the lowest count.

8. The method of claim 5, wherein the count has a predetermined maximum value.

9. The method of claim 1, wherein for each of the graphics data items, the indicator for that graphics data item indicates one of four conditions, the four conditions being:
    (i) that the number of tiles with which that graphics data item is associated is equal to one,
    (ii) that the number of tiles with which that graphics data item is associated is equal to two,
    (iii) that the number of tiles with which that graphics data item is associated is equal to three or four, and
    (iv) that the number of tiles with that graphics data item is associated is greater than four.

10. The method of claim 1, wherein the order in which tiles are to be processed is determined further based on a determination of which of the graphics data items are present in each of the tiles.

11. A graphics system comprising a cache configured to store graphics data items which are associated with tiles within the graphics system, wherein the graphics system is configured to:
    store graphics data items in the cache, wherein each of the graphics data items in the cache is associated with an indicator which is indicative of a number of tiles with which the graphics data item is associated; and
    determine an order in which tiles are to be processed based on the indicators of the graphics data items in the cache.

12. The graphics system of claim 11, wherein the graphics system is further configured to evict a graphics data item from the cache in dependence on the indicator associated with the graphics data item.

13. The graphics system of claim 11, further configured to determine the indicators for the graphics data items.

14. The graphics system of claim 11, further comprising processing logic configured to process graphics data items from the cache in accordance with the determined order.

15. The graphics system of claim 11, wherein the graphics data items are stored in graphics data sets in a graphics data memory, each of the graphics data sets comprising one or more of the graphics data items.

16. The graphics system of claim 15, wherein a particular graphics data item is associated with a particular tile if a graphics data item in the graphics data set comprising the particular graphics data item is to be used to process the particular tile, and wherein for each of the graphics data items, the indicator for that graphics data item is indicative of the number of tiles which are processed using a graphics data item in the graphics data set comprising that graphics data item.

17. The graphics system of claim 15, wherein the graphics data sets are textures and the graphics data memory is a texture memory.

18. The graphics system of claim 11, wherein a particular graphics data item is associated with a particular tile if the particular graphics data item is to be used to process the particular tile, and wherein for each of the graphics data items, the indicator for that graphics data item is indicative of the number of tiles which are processed using that graphics data item.

19. The graphics system of claim 11, wherein the graphics system is configured to determine the order in which tiles are to be processed further based on a determination of which of the graphics data items are present in each of the tiles.

20. A non-transitory computer readable storage medium having stored thereon a computer readable description of an integrated circuit that, when processed, causes a system to generate a processing unit, said processing unit being configured to process data in a graphics system wherein graphics data items are associated with tiles within the graphics system, said processing unit being further configured to:
    store graphics data items in a cache, wherein each of the graphics data items in the cache is associated with an indicator which is indicative of a number of tiles with which the graphics data item is associated; and
    determine an order in which tiles are to be processed based on the indicators of the graphics data items in the cache.

* * * * *